US010493491B2

(12) United States Patent
Grose, II

(10) Patent No.: US 10,493,491 B2
(45) Date of Patent: Dec. 3, 2019

(54) SPRING SEAT

(71) Applicant: TABOR MACHINE COMPANY, LLC, Princeton, WV (US)

(72) Inventor: Billy B. Grose, II, Bluefield, WV (US)

(73) Assignee: TABOR MACHINE COMPANY, LLC, Princeton, WV (US)

( * ) Notice: Subject to any disclaimer, the term of this patent is extended or adjusted under 35 U.S.C. 154(b) by 0 days.

(21) Appl. No.: 15/584,797

(22) Filed: May 2, 2017

(65) Prior Publication Data

US 2017/0312784 A1 Nov. 2, 2017

Related U.S. Application Data

(60) Provisional application No. 62/330,674, filed on May 2, 2016.

(51) Int. Cl.

| | |
|---|---|
| ***B07B 1/44*** | (2006.01) |
| ***B07B 1/28*** | (2006.01) |
| ***B07B 1/46*** | (2006.01) |
| ***F16F 1/12*** | (2006.01) |
| *B07B 1/42* | (2006.01) |
| *F16F 3/04* | (2006.01) |

(52) U.S. Cl.

CPC .................. *B07B 1/44* (2013.01); *B07B 1/28* (2013.01); *B07B 1/46* (2013.01); *F16F 1/125* (2013.01); *B07B 1/42* (2013.01); *F16F 3/04* (2013.01)

(58) Field of Classification Search

CPC .. B07B 1/44; B07B 1/42; B07B 1/284; B07B 1/46; F16F 15/067; F16F 1/04; F16F 2230/0011; F16F 2238/026

See application file for complete search history.

(56) References Cited

U.S. PATENT DOCUMENTS

| | | | | |
|---|---|---|---|---|
| 2,192,278 A * | 3/1940 | Symons | B07B 1/284 | 209/275 |
| 2,581,416 A * | 1/1952 | Irby | F16F 1/125 | 248/624 |
| 2,828,014 A * | 3/1958 | Wantling | B07B 1/284 | 188/268 |
| 3,630,357 A * | 12/1971 | Nolte | B07B 1/28 | 209/326 |
| 5,100,539 A * | 3/1992 | Tsutsumi | B07B 1/46 | 209/240 |
| 5,494,173 A * | 2/1996 | Deister | B07B 1/42 | 209/326 |
| 6,082,551 A * | 7/2000 | Kai | B07B 1/42 | 209/307 |
| 2010/0108574 A1* | 5/2010 | Ouriev | B07B 1/42 | 209/240 |

* cited by examiner

*Primary Examiner* — Xuan Lan Nguyen

(74) *Attorney, Agent, or Firm* — Birch, Stewart, Kolasch & Birch, LLP

(57) ABSTRACT

A step-down spring seat assembly secured to a vibratory screen machine is configured to receive one or more universal adapter plate assemblies, to which one or more compression springs is secured. The universal adapter plate assemblies are secured to a top surface of the step-down spring seat assembly, and one or more spring guide castings are connected to the one or more universal adapter plate assemblies. Compression springs are positioned atop the spring guide castings, and are secured to a top adapter plate assembly that is connected to one or more universal adapter plate assemblies positioned above the one or more compression springs.

11 Claims, 5 Drawing Sheets

100

110

108

106

104

106

108

104

112

102

112

SPRING SEAT

CROSS REFERENCE TO RELATED APPLICATIONS

This application claims the benefit of U.S. application No. 62/330,674, filed May 2, 2016, the contents of which are incorporated herein by reference.

FIELD OF INVENTION

This application is directed generally to equipment for classifying, separating, and assorting solids. More particularly, the application is directed to vibratory screen deck apparatus having one or more supporting spring assemblies.

BACKGROUND

Mechanical screening, often just called screening, is the practice of taking granulated ore material and separating it into multiple grades by particle size. This practice occurs in a variety of industries such as mining and mineral processing, agriculture, pharmaceutical, food, plastics, and recycling.

The mining and mineral processing industry uses screening for a variety of processing applications. For example, after mining the minerals, the material is transported to a primary crusher. Before crushing large boulder are scalped on a shaker with 0.25 in (6.4 mm) thick shielding screening. Further down stream after crushing the material can pass through screens with openings or slots that continue to become smaller. Finally, screening is used to make a final separation to produce saleable products based on a grade or a size range.

A screening machine includes a drive that induces vibration, a screen media that causes particle separation, and a deck that holds the screen media and the drive and is the mode of transport for the vibration.

There are physical factors that make screening practical. For example, vibration, gravitational force, bed density, and material shape all facilitate the rate or cut. However, physical factors also can be the source of screening problems. Electrostatic forces, for example, can hinder screening efficiency by way of water attraction causing sticking or plugging, or very dry material can generate a charge that causes the material to attract to the screen itself. Different types of vibratory motion have their advantages and disadvantages. In addition media types also have their different properties that lead to advantages and disadvantages. Finally, because of the constant motion and vibration, maintenance and upkeep of the frame and support equipment which make vibratory screening possible can be challenging.

As shown in FIGS. 1 and 2, the screen deck assembly often is mounted on a frame that can include steel I-channel beams. More specifically, the screen deck assembly can be mounted atop steel coil springs that are positioned on the frame. A problem with this design arises when the coil springs become worn, broken, or otherwise need to be replaced. The entire screen deck assembly must be raised vertically a sufficient distance to allow the coil springs also to be raised vertically and removed from the guides on which the springs are mounted. Thus, there is a need in the industry for an alternative spring mounting design to make spring repair or replacement easier, faster, and less costly.

SUMMARY OF THE INVENTION

The present invention solves the foregoing problems by providing a spring seat assembly with detachable adapter plates, which allows for horizontal rather than vertical displacement of the coil spring when repair or replacement is required.

One aspect of the invention includes a (i) step-down spring seat assembly, (ii) one or more universal adapter plate assemblies secured to a top surface of the spring seat assembly, (iii) one or more spring guide castings positionable below and above a center opening in a spring, (iv) a top adapter plate assembly, and (v) a detachable spring seat base. The application is useful for facilitating removal of coil springs from a vibratory screen deck assembly.

A second aspect of the invention is a step-down spring seat assembly configured to be secured to a vibratory screen machine; one or more universal adapter plate assemblies secured to a top surface of the step-down spring seat assembly; one or more spring guide castings connected to the one or more universal adapter plate assemblies; one or more compression springs positioned atop the one or more spring guide castings; one or more spring guide castings configured to be positioned above a center opening in the one or more compression springs; one or more universal adapter plate assemblies connected to the spring guide castings positioned above the center opening in the one or more compression springs; a top adapter plate assembly connected to the one or more universal adapter plate assemblies positioned above the one or more compression springs, wherein the top adapter plate assembly is configured to be secured to a vibratory screen machine; and a spring seat base attached to a side of the step-down spring seat assembly.

A third aspect of the invention is a step-down spring seat assembly configured to be secured to a vibratory screen machine and further configured to receive one or more universal adapter plate assemblies connected to the bottom of a compression spring.

A fourth aspect of the invention is a method of replacing a compression spring on a vibratory screen machine, including: raising the vibratory screen machine above the compression spring to be replaced; disconnecting universal adapter plate assemblies from a step-down spring seat assembly secured to the vibratory screen machine; disconnecting universal adapter plate assemblies from a top adapter plate assembly secured to a vibratory screen machine; and sliding the universal adapter plate assemblies from the vibratory screen machine.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

In one of the many preferred embodiments of the invention, a spring seat apparatus is configured to receive universal adapter plates to which compression springs are secured. The universal adapter plates can be slid horizontally away from the vibratory screen machine. As a result, the vibratory screen machine does not have to be lifted high enough for the compression springs to be removed by vertically.

Figure 1:
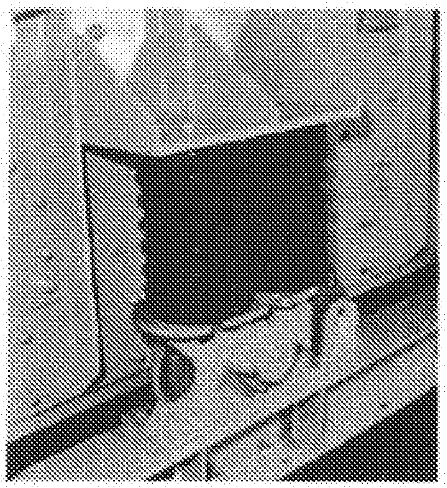
FIG. 1 shows a vibratory screen machine compression springs on a conventional spring seat assembly on an I-beam.
Figure 2:
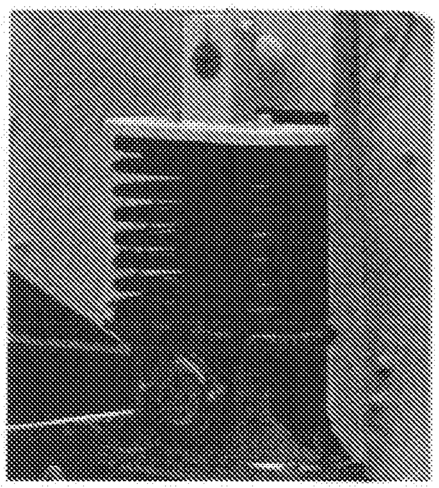
FIG. 2 shows a vibratory screen machine compression springs on a conventional spring seat assembly on the ground.
Figure 3:
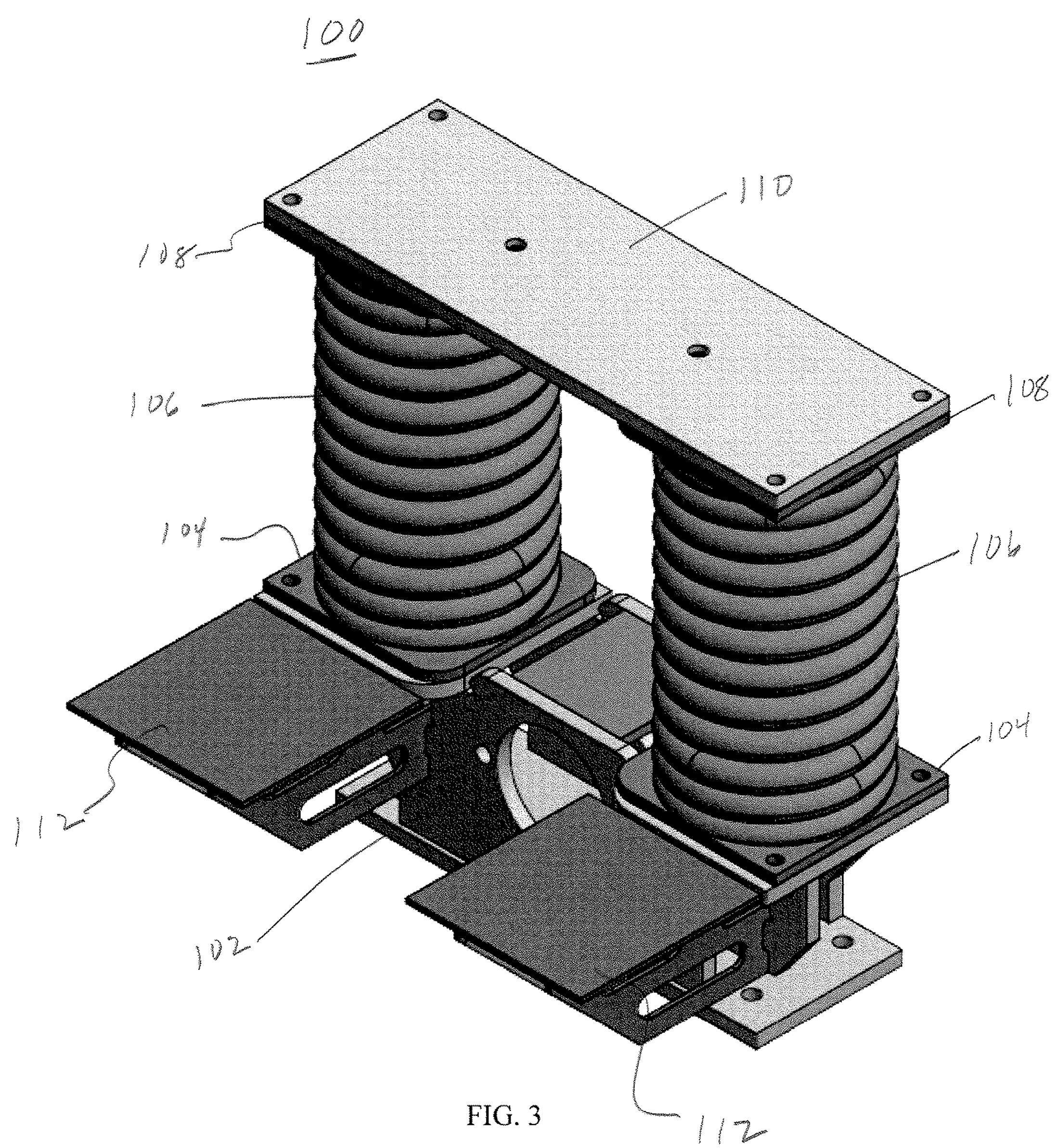
FIG. 3 is an isometric view of one of many preferred embodiments of the apparatus of the present invention.

Referring to FIG. 3, an apparatus 100 of the present invention is shown generally. The apparatus 100 includes a step-down spring seat assembly 102 configured to be secured to a vibratory screen machine. One or more universal adapter plate assemblies 104 can be secured to a top surface of the step-down spring seat assembly 102. One or more compression springs 106 can be secured to the step-down spring seat assembly 102 by placing the compression springs 106 on the universal adapter plate assemblies 104. One or more universal adapter plate assemblies 108 can be positioned between the compression springs 106 and a top adapter plate assembly 110, which is configured to be secured to a vibratory screen machine. A spring seat base 112 can be attached to a side of the step-down spring seat assembly 102.

Figure 4:
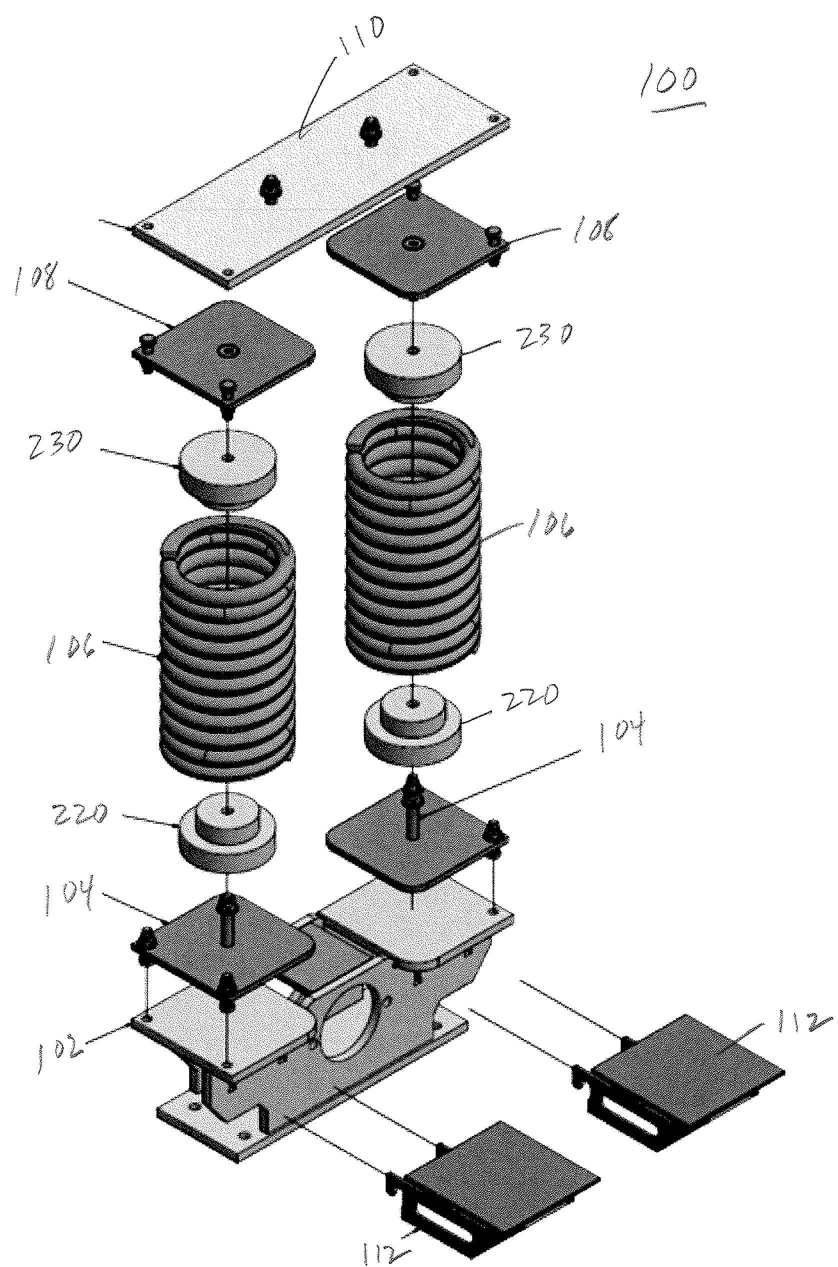
FIG. 4 is an exploded view of one of many preferred embodiments of the apparatus of the present invention.

As shown more clearly in FIG. 4, one or more universal adapter plate assemblies 104 optionally but preferably are secured to a top surface of the step-down spring seat assembly 102, which is configured to receive the universal adapter plate assemblies 104. One or more spring seat bases 112 can be detachably connected to the step-down spring seat assembly 102 in front of each of the compression springs 106. The spring seat bases 112 provide a stable platform on which to work once the compression springs 106 are removed, preferably slidably, from the step-down spring seat assembly 102. One or more spring guide castings 220 are positioned atop and connected to the one or more universal adapter plate assemblies 104 secured to the top surface of the step-down spring seat assembly 102. One or more compression springs 106 are positioned atop the one or more spring guide castings 220, and one or more spring guide castings 230 can be positioned above a center opening in the one or more compression springs 106. One or more universal adapter plate assemblies 108 can be connected to the spring guide castings 108 positioned above the center opening in the one or more compression springs 106. A top adapter plate assembly 110 can be connected to the one or more universal adapter plate assemblies 108 positioned above the one or more compression springs 106, wherein the top adapter plate assembly 110 is configured to be secured to a vibratory screen machine.

Figure 5:
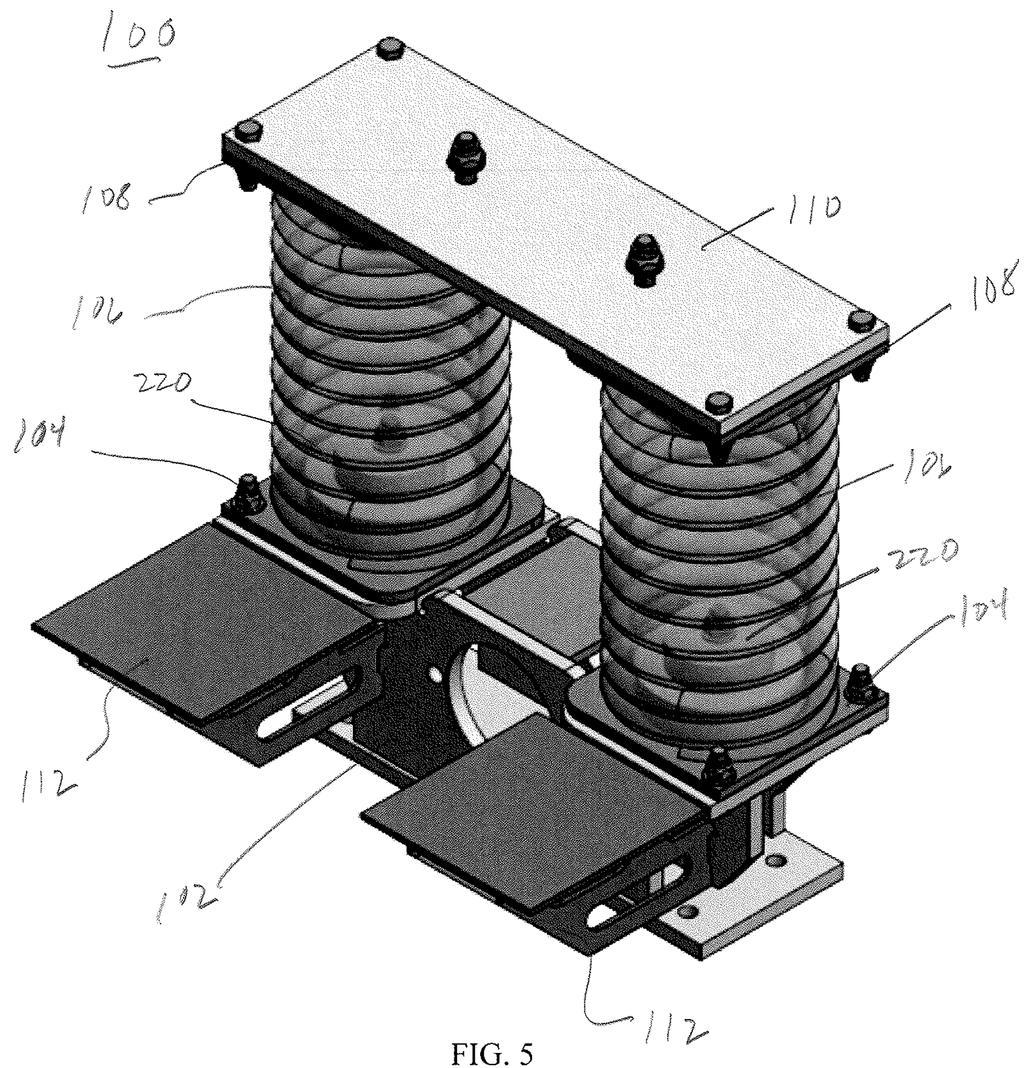
FIG. 5 is an isometric view of one of many preferred embodiments of the apparatus of the present invention in which the springs are transparent for clarity.

FIG. 5 shows an apparatus 100 with clear compression springs 106 to show more clearly the connection of the spring guide castings 220 to the universal adapter plate assemblies 104. The universal adapter plate assemblies 104 are secured to a top surface of the step-down spring seat assembly 102, which is configured to receive the universal adapter plate assemblies 104. One or more spring seat bases 112 can be detachably connected to the step-down spring seat assembly 102 in front of each of the compression springs 106. The spring seat bases 112 provide a stable platform on which to work once the compression springs 106 are removed, preferably slidably, from the step-down spring seat assembly 102. One or more spring guide castings 220 are positioned atop and connected to the one or more universal adapter plate assemblies 104 secured to the top surface of the step-down spring seat assembly 102. One or more compression springs 106 are positioned atop the one or more spring guide castings 220. A top adapter plate assembly 110 is connected to the compression springs 106 via one or more universal adapter plate assemblies 108 positioned above the one or more compression springs 106.

Figure 6:
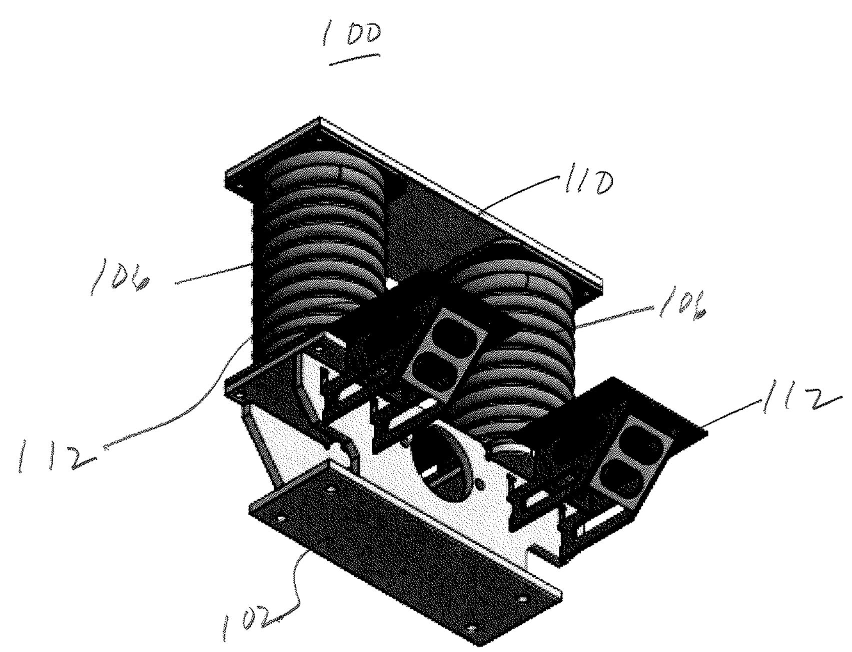
FIG. 6 is a bottom isometric view of one of many preferred embodiments of the apparatus of the present invention.

As shown in FIG. 6, the step-down spring seat assembly 102 is configured to be secured to a vibratory screen machine. The apparatus 100 of the present invention can be used to more easily replace the compression springs 106 that are an integral part of the vibratory screen machine. The spring seat bases 112 can be connected to the step-down spring seat assembly 102 be placing the arms extending from the spring seat bases 112 in the slots in the side of the step-down spring seat assembly 102. The spring seat bases 112 provide a stable platform onto which the compression springs 106 can be slid for removal and/or repair. The universal adapter plate assemblies 104, 108 can be disconnected from the step-down spring seat assembly 102 and top adapter plate assembly 110 and slid horizontally onto the spring seat bases 112. The springs can then be removed and replaced by disconnecting the spring guide castings 220, 230 from the universal adapter plate assemblies 104, 108, respectively. Once new compression springs 106 are installed, the apparatus 100 can be re-assembled and installed back on to the vibratory screen machine.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention. Thus, the breadth and scope of the invention should not be limited by any of the above-described exemplary embodiments.

What is claimed is:

1. An apparatus, comprising:

a step-down spring seat member configured to be secured to a vibratory screen machine;

first universal adapter plate secured to a top surface of the step-down spring seat member;

a first spring guide casting connected to the top surface of the first universal adapter plates;

a compression springs positioned atop the first spring guide casting;

a second spring guide casting configured to be positioned above a center opening in the top of the compression springs;

a second universal adapter plate connected to the second spring guide casting positioned above the center opening in the compression springs;

a top adapter plate connected to the second universal adapter plate positioned above the compression springs, wherein the top adapter plate is configured to be secured to the vibratory screen machine; and a spring seat base attached to a side of the step-down spring seat member, such that the spring seat base is adjacent to the step-down spring seat member, and the top surface of the spring seat base is generally flush with the top surface of the step-down spring seat member.

2. The apparatus of claim 1, wherein the first universal adapter plate is detachably secured to the top surface of the step-down spring seat member.

3. The apparatus of claim 1, wherein the second universal adapter plate connected to the second spring guide casting positioned above the center opening in the compression springs is detachably connected to the top adapter plate.

4. The apparatus of claim 1, wherein the spring seat base is detachably attached to a side of the step-down spring seat member.

5. An apparatus, comprising:

a step-down spring seat member configured to be secured to a vibratory screen machine and further configured to receive a first universal adapter plate connected to a bottom of a compression spring; and a spring seat base attached to a side of the step-down spring seat member, such that the spring seat base is adjacent to the step-down spring seat member, and wherein the top surface of the spring seat base is generally flush with the top surface of the step-down spring seat member.

6. The apparatus of claim 5, further comprising a top adapter plate configured to be secured to the vibratory screen machine and further configured to receive a second universal adapter plate connected to the top of a compression spring.

7. The apparatus of claim 5, wherein the first universal adapter plate is detachably connected to the step-down spring seat member, and a second universal adapter plate is detachably connected to the top adapter plate.

8. An apparatus, comprising:

a step-down spring seat member configured to be secured to a vibratory screen machine;

a top adapter plate secured to the vibratory screen machine;

a first universal adapter plates detachably connected to the step-down spring seat member, and a second universal adapter plate detachably connected to the top adapter plate; and a spring seat base attached to a side of the step-down spring seat member, wherein the top surface of the spring seat base is adjacent to, and generally flush with, the top surface of the step-down spring seat member.

9. The apparatus of claim 8, further comprising a first spring guide castings connected to the first universal adapter plate.

10. The apparatus of claim 9, further comprising a compression springs positioned atop the first spring guide castings.

11. The apparatus of claim 10, further comprising a second spring guide castings configured to be positioned above a center opening in the compression springs.

* * * * *